(12) United States Patent
VanRaaphorst

(10) Patent No.: US 8,899,603 B2
(45) Date of Patent: Dec. 2, 2014

(54) CLOSED LOOP PRESSURE CONTROL FOR DUAL AIR SPRING CONFIGURATION

(75) Inventor: David A. VanRaaphorst, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1079 days.

(21) Appl. No.: 12/416,310

(22) Filed: Apr. 1, 2009

(65) Prior Publication Data

US 2010/0253017 A1 Oct. 7, 2010

(51) Int. Cl.
*B60G 17/04* (2006.01)
*B60G 17/052* (2006.01)
*F16F 9/05* (2006.01)
*B60G 17/016* (2006.01)
*B60G 17/048* (2006.01)
*B60G 17/015* (2006.01)

(52) U.S. Cl.
CPC .......... *B60G 17/0155* (2013.01); *B60G 17/016* (2013.01); *B60G 17/0485* (2013.01); *B60G 2600/20* (2013.01); *B60G 2800/162* (2013.01); *B60G 2600/124* (2013.01); *B60G 2400/252* (2013.01); *B60G 2800/014* (2013.01); *B60G 2400/51222* (2013.01); *B60G 2800/012* (2013.01); *B60G 2600/182* (2013.01); *B60G 2202/314* (2013.01); *B60G 2500/202* (2013.01); *B60G 17/0521* (2013.01); *B60G 2202/152* (2013.01); *B60G 2500/2041* (2013.01); *B60G 2600/70* (2013.01); *F16F 9/057* (2013.01); *B60G 2400/51* (2013.01); *B60G 2202/412* (2013.01); *B60G 2600/09* (2013.01); *B60G 2600/1877* (2013.01); *B60G 2800/91* (2013.01); *F16F 2230/08* (2013.01); *B60G 2800/702* (2013.01)

USPC .......... 280/124.157; 280/5.515; 280/124.161; 267/64.23; 267/64.24

(58) Field of Classification Search
USPC ........... 280/124.157, 124.16, 124.161, 5.515, 280/5.507, 5.508, 5.513, 124.101; 267/64.15–64.28
See application file for complete search history.

(56) References Cited

U.S. PATENT DOCUMENTS

| | | | | |
|---|---|---|---|---|
| 4,325,541 A | * | 4/1982 | Korosladanyi et al. | 267/220 |
| 4,629,170 A | * | 12/1986 | Warmuth, II | 267/64.27 |
| 4,722,548 A | | 2/1988 | Hamilton et al. | |
| 4,798,369 A | * | 1/1989 | Geno et al. | 267/64.11 |
| 4,817,922 A | * | 4/1989 | Hovance | 267/64.21 |
| 4,852,903 A | | 8/1989 | Tanaka et al. | |
| 4,861,067 A | | 8/1989 | Booher | |
| 4,877,223 A | * | 10/1989 | Hackett | 267/64.17 |
| 5,632,471 A | * | 5/1997 | Pradel | 267/64.11 |
| 6,827,341 B2 | * | 12/2004 | Bank et al. | 267/64.21 |

(Continued)

FOREIGN PATENT DOCUMENTS

| | | |
|---|---|---|
| DE | 102004023240 | 12/2005 |
| GB | 2164725 | 3/1986 |
| GB | 2218677 | 11/1989 |
| JP | 3177633 | 8/1991 |

*Primary Examiner* — Faye M Fleming
*Assistant Examiner* — George Spisich
(74) *Attorney, Agent, or Firm* — Brooks Kushman P.C.

(57) ABSTRACT

An active air suspension system includes an air spring assembly that has a piston airbag and a primary airbag mounted around the piston airbag to provide a variable force and rate dual air spring configuration. The air suspension system is configured to accurately control pressure within the piston airbags in a closed-loop manner. Continuous control of the piston pressure provides an accurate increase or decrease of spring rate or force depending on the controller inputs.

21 Claims, 4 Drawing Sheets

(56) References Cited

U.S. PATENT DOCUMENTS

| | | |
|---|---|---|
| 7,156,382 B2 * | 1/2007 | Lloyd ................. 267/64.28 |
| 7,287,760 B1 | 10/2007 | Quick et al. |
| 2003/0173723 A1 * | 9/2003 | Behmenburg et al. ........ 267/122 |
| 2005/0173851 A1 | 8/2005 | Lloyd |
| 2006/0267297 A1 * | 11/2006 | Nordmeyer et al. ....... 280/5.515 |
| 2007/0073461 A1 | 3/2007 | Fielder |
| 2008/0054537 A1 * | 3/2008 | Harrison ................. 267/64.16 |
| 2010/0096786 A1 * | 4/2010 | Orlamunder et al. ...... 267/64.27 |

* cited by examiner

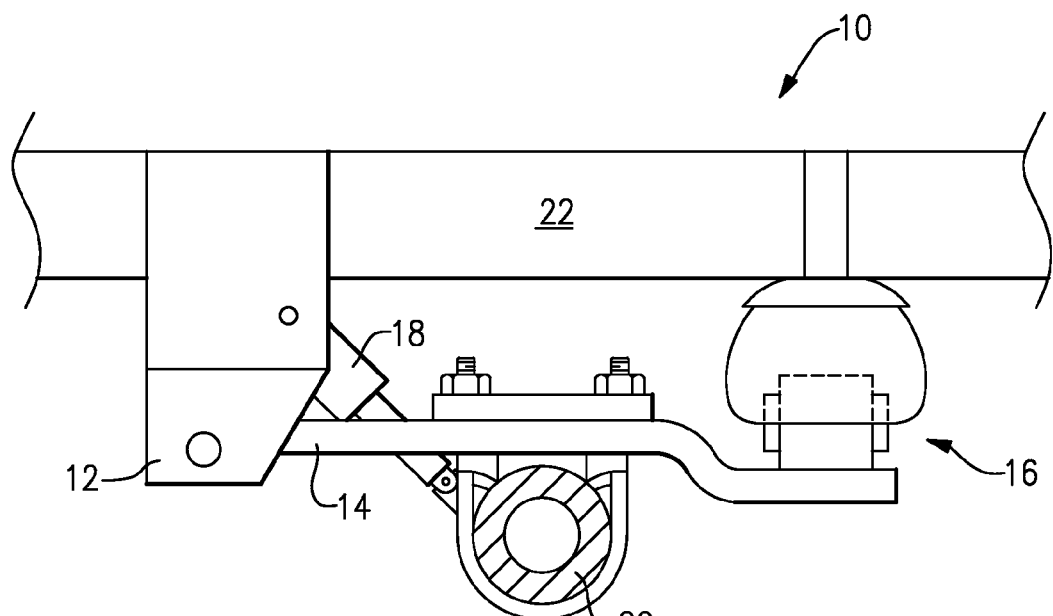
FIG.1
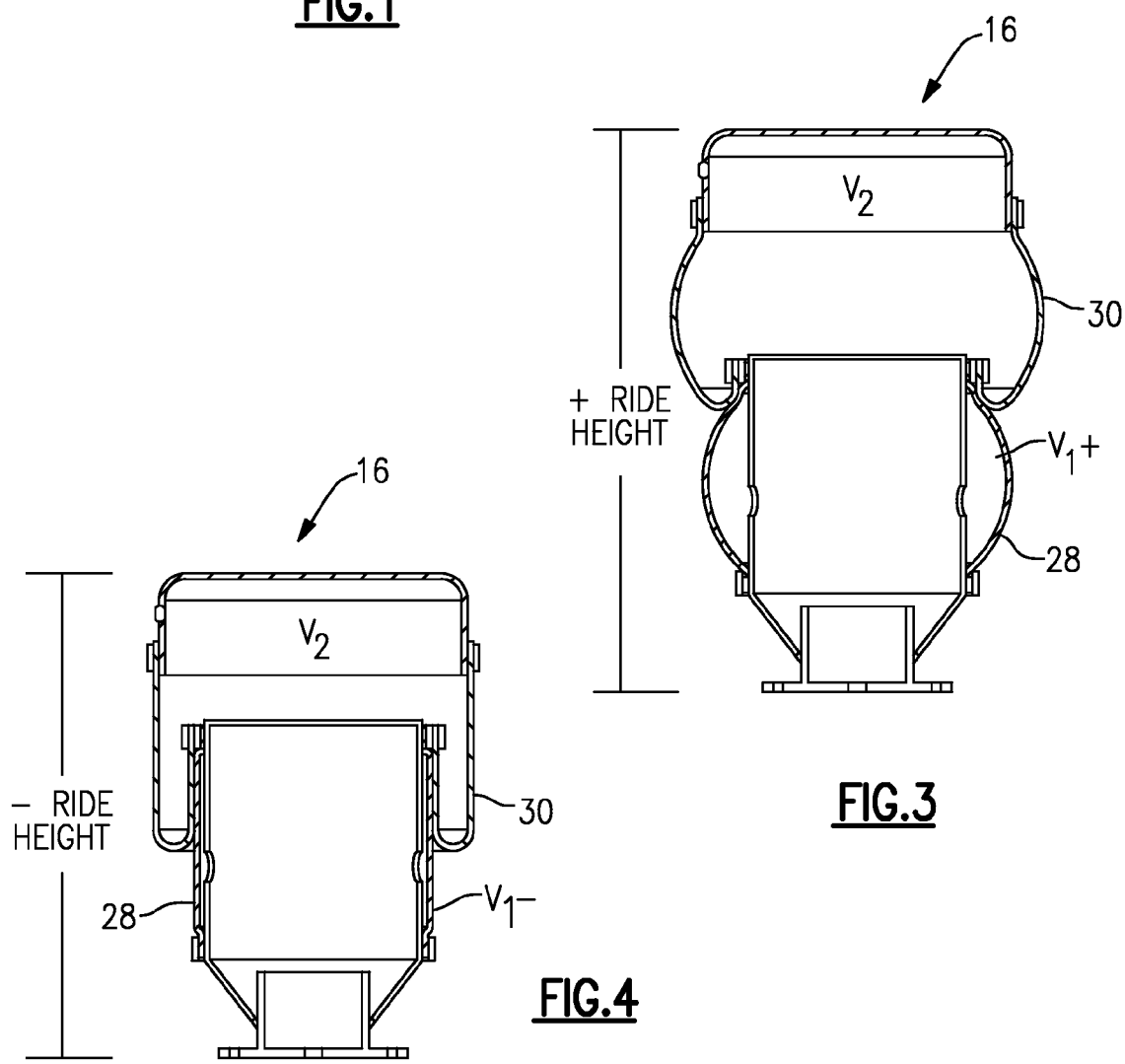
FIG.3
FIG.4

CLOSED LOOP PRESSURE CONTROL FOR DUAL AIR SPRING CONFIGURATION

TECHNICAL FIELD

This invention generally relates to an active air suspension system with a variable force and rate dual air spring that accurately controls pressure in a closed-loop manner.

BACKGROUND OF THE INVENTION

Air suspensions utilize air springs to provide desired output characteristics, such as ride comfort and vehicle performance for example. One known active air suspension uses an air spring assembly that includes a primary airbag mounted around a piston airbag such that the piston airbag provides a rolling surface for the primary airbag. A change in piston airbag volume changes an effective piston area of the primary airbag. A relatively small change in the effective piston area provides a change in a spring rate of the air spring assembly. The pressures in the piston airbag and the primary airbag are selectively controlled to provide infinite variation in spring rates and ride heights. The smaller volume of the piston airbag relative to the larger volume of the primary airbag permits rapid pressure and volume changes to enable active suspension control. However, with a variable force and rate dual air spring configuration described above, it can be difficult to control air supply to and from the piston airbag in an accurate manner.

SUMMARY OF THE INVENTION

An active air suspension system with a variable force and rate dual air spring accurately controls piston pressure in a closed-loop manner.

In one example, the active air suspension system includes an air spring assembly that has a piston airbag and a primary airbag mounted around the piston airbag to provide the variable force and rate dual air spring configuration. The air suspension system is configured to accurately control pressure within the piston airbags in a closed-loop manner.

In one example, the desired piston airbag characteristic comprises a desired piston airbag diameter to provide a desired spring stiffness. At least one pressure sensor measures the pressure within the piston airbag. The controller continuously receives pressure input signals from the pressure sensor, which indicates pressure changes within the piston airbag. The controller actively adjusts pressure within the piston airbag in response to these pressure changes to maintain the desired spring stiffness in a closed-loop manner.

In one example, the controller generates electric control signals to actively control the valve assembly to control air flow into and out of the piston airbag.

In one configuration, there are a plurality of air spring assemblies each having one primary airbag and one associated piston airbag, the valve assembly comprises a separate valve assembly for each air spring assembly, and there are a plurality of pressure sensors with one pressure sensor being associated with each piston airbag. The controller continuously receives pressure input signals from each of the pressure sensors indicating specific pressure changes within the associated piston airbag. The controller then actively adjusts pressure within each of the piston airbags in response to the pressure changes to maintain the desired spring stiffness in a closed-loop manner.

In one example, the controller generates a plurality of control signals to control air supply into and out of each piston airbag independently of all other piston airbags.

These and other features of the present invention can be best understood from the following specification and drawings, the following of which is a brief description.

BRIEF DESCRIPTION OF THE DRAWINGS

FIG. 1 is a general side view of one example of an active air suspension as installed on a vehicle.

FIG. 3 is a sectional view of the air spring in a first position.

FIG. 4 is a sectional view of the air spring in a second position.

DETAILED DESCRIPTION OF THE PREFERRED EMBODIMENT

Figure 2:
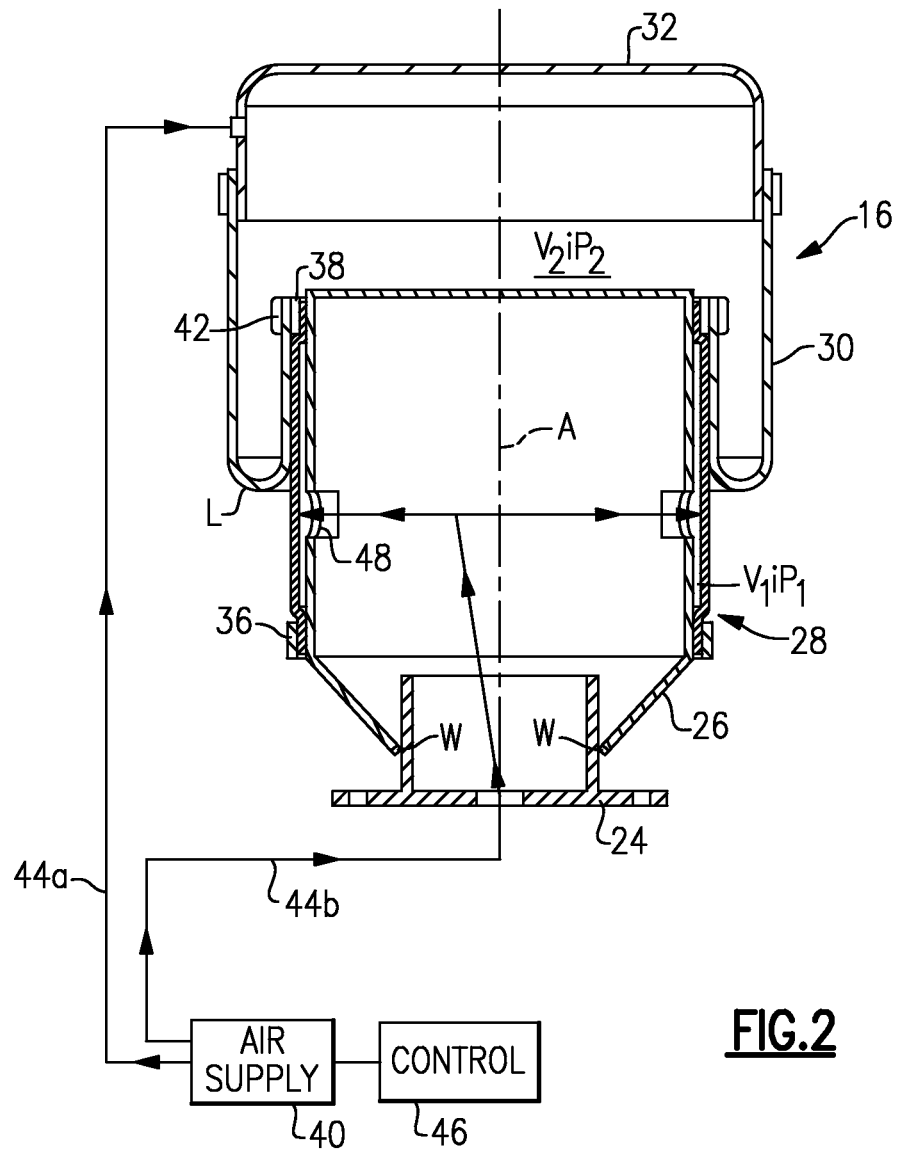
FIG. 2 is a sectional view of an air spring assembly as used in the active air suspension of FIG. 1.

FIG. 1 illustrates an air suspension system 10 for a vehicle. The air suspension system 10 generally includes a bracket 12, a longitudinal member 14, an air spring assembly 16, a damper 18, and an axle assembly 20. The air suspension system 10 is fixed to a frame or chassis of the vehicle (shown schematically at 22). The longitudinal member 14 could comprise a suspension arm, for example, and the axle assembly 20 could comprise any type of axle, such as a drive axle, non-drive axle, trailer axle, etc. The axle assembly 20 extends between laterally spaced wheels (not shown). It should be understood that the air suspension system 10 includes a longitudinal member 14, an air spring assembly 16, and a damper 18 at each lateral end of the axle.

Referring to FIG. 2, the air spring assembly 16 is illustrated in cross-section. The air spring assembly 16 is defined along a central vertical axis A and includes a lower mount 24 (illustrated schematically), a piston structure or support 26 attached to the lower mount 24, a piston airbag 28, and a primary airbag 30. An upper mount 32 is attached to the primary airbag 30. The upper 32 and lower 24 mounts provide attachment for the air spring assembly 16 between the longitudinal member 14 and chassis 22 (see FIG. 1).

The piston support 26 is a cylindrical member defined about the axis A. At the lower mount 24 the piston support 26 can be attached to many different structures such as a strut, shock, damper, or other similar mechanism, for example. In one example, the piston support 26 is attached to the lower mount 24 at welds W; however other attachment methods could also be used. The piston support 26 and the lower mount 24 are relatively rigid components.

The piston airbag 28 is a flexile, resilient member and is attached to the piston support 26 through a first band 36 and a second band 38. The first band 36 is secured at a lower end of the piston support 26 and the second band 38 is secured at an upper or opposite end of the piston support 26. While bands are shown, it should be understood that other attachment structures and/or methods could be used to secure the piston airbag 28 to the piston support 26. The piston airbag 28 defines a first volume V1 that is enclosed vertically between the bands 36, 38 and between an inner surface of the piston airbag 28 and an outer surface of the piston support 26.

The primary airbag 30 is mounted to the piston air bag 28 through a third band 42 which is spaced radially outwardly relative to the second band 38 with the primary airbag 30 being located between the second 28 and third 42 bands. In other words, the primary airbag 30 is sandwiched between the third band 42 and the second band 38. The primary airbag 30 defines a second volume V2. It should be understood that while two volumes V1, and V2 are disclosed in the illustrated embodiment, additional volumes could also be utilized within the spring assembly 16 as needed. Further, any of these volumes may be selectively segmented to provide further incremental volume changes.

An air supply system 40 (illustrated schematically in FIG. 2) communicates air independently into the volumes V1, V2 through a first and a second supply conduits 44a, 44b respectively in response to a controller 46 (illustrated schematically). The controller 46 is a suspension controller that provides active suspension control methodology. Ports 48 through the piston support 26 supply air into the first volume V1.

The piston airbag 28 operates as a rolloff piston surface for the primary airbag 30. In other words, the primary airbag 30 provides a rolling lobe L over a piston assembly having a variable diameter provided by the variable volume of the piston airbag 28. As the air spring assembly 16 experiences road load inputs, the lobe L of the primary airbag 30 rolls along the outer surface of the piston airbag 28. By changing the volume V1 or pressure P1 within the piston airbag 28 the outer diameter of the piston airbag 28 changes. A change in the piston airbag 28 volume V1 thereby changes the effective piston area of the primary airbag 30. It is also understood that the primary airbag 30 will exert a pressure P2 against the piston airbag 28, tending to reduce the outer diameter of the piston airbag 28 until an equilibrium diameter is reached. Therefore a change in pressure P1 will change the radial spring rate of the piston airbag 28 and change the equilibrium diameter also affecting the primary airbag spring rate.

Referring to FIG. 3, increasing the air pressure within the volume V1 increases the diameter of the piston airbag 28 to obtain a greater spring rate and ride height. That is, the increase in diameter of the piston airbag 28 results in an extension of the airbag assembly 16 as volume V1 effectively provides a larger rolloff piston. The opposite results are obtained when the pressure within the piston airbag 28 is reduced as volume V1 respectively decreases (FIG. 4). This reduces the ride height and spring rate.

A relatively small change in volume V1 provides a change in the spring rate of the primary airbag 30 as the diameter of the rolloff surface is selectively modified. A change in the pressure within the volume V1 couples a change in spring rate with a change in ride height when the pressure within volume V2 is maintained. The compression and rebound rates may alternatively be decoupled by simultaneously changing the volume of both V1 and V2.

By selectively controlling the pressure within volumes V1 and V2, infinite variation in spring rates are provided without an auxiliary tank and associated actuators. The relatively smaller volume of volume V1 relative to volume V2 permits rapid pressure and volume changes which enables active suspension control.

Figure 5:
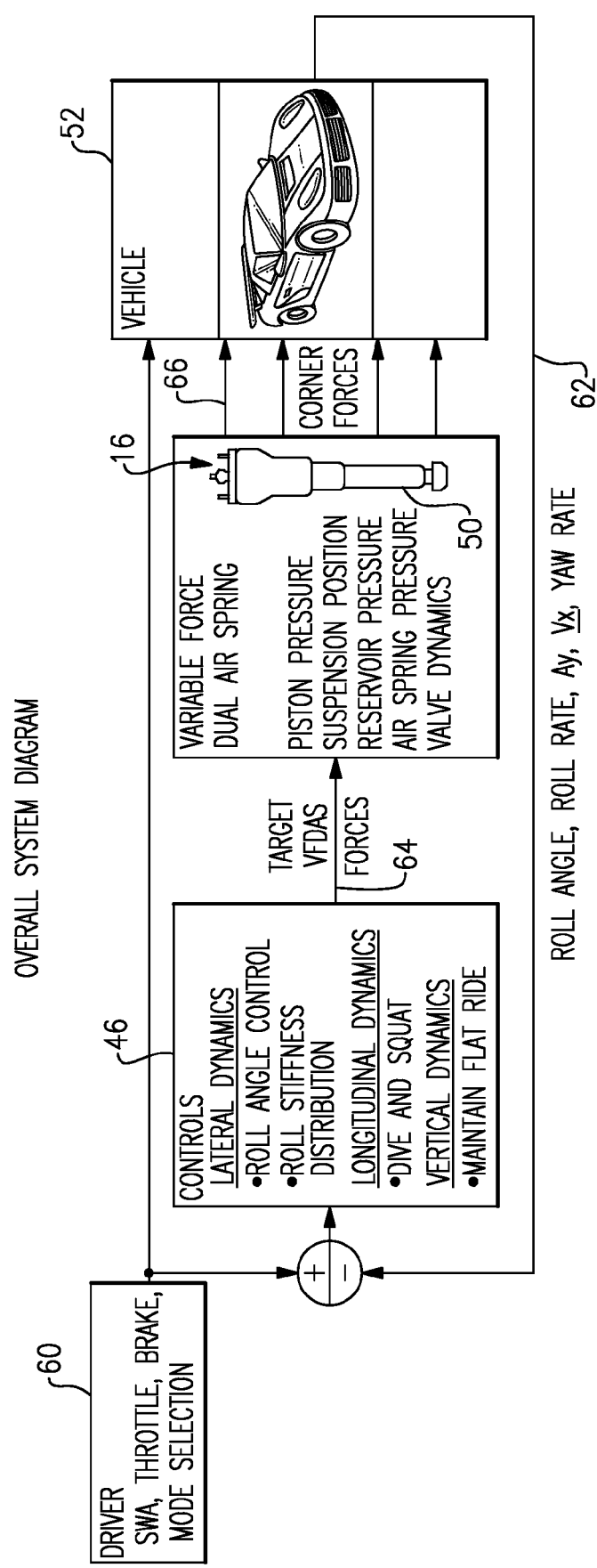
FIG. 5 is a diagram showing an overall system incorporating variable force and rate dual air springs for a vehicle.

In the example shown in FIG. 5, each air spring assembly 16 is associated with one damper 50. In one example, the damper 50 comprises an electrically controlled shock absorber. An outer structure of the damper 50 is attached to the lower mount 24 of the air spring assembly 16. There is one air spring and damper combination associated with each wheel, i.e. corner, of the vehicle 52 shown in FIG. 5. The controller 46 is configured to use the variable force and rate dual air spring configuration in combination with the damper to provide a real-time control of modulation of spring stiffness to improve vehicle handling and/or ride comfort.

As shown in FIG. 5, there are a plurality of driver inputs 60 to the vehicle 52, which are communicated to the controller 46. Examples of such inputs include steering wheel inputs, throttle inputs, brake inputs, transmission mode selection, etc. A plurality of vehicle inputs 62 (which can be vehicle states) are also communicated to the controller 46. Examples of these inputs include vehicle roll angle, roll rate, yaw rate, various directional accelerations, etc. The controller 46 can also receive various inputs that are associated with the air spring assemblies 16. Examples of these inputs include damper inputs, suspension position (ride height), air supply reservoir pressure, pressure within the airbags 28, 30, flow valve dynamics, etc.

The controller 46 uses these inputs 60, 62 to control various dynamics of the vehicle 52. For example, the controller 46 uses these inputs to control vehicle lateral dynamics (such as roll angle and roll stiffness for example), longitudinal dynamics (dive and squat for example), and vertical dynamics (maintenance of a flat ride for example). The controller 46 accomplishes this by generating control signals 64 that are communicated to the variable force and rate dual air spring assemblies 16 that are located at each vehicle wheel. The controller 46 determines a target spring force for each of these air spring assemblies 16 and then controls air flow into and out of the air spring assemblies 16 to achieve the target force. When the target forces are achieved at each air spring assembly 16, desired cornering forces 66 can then be provided at each wheel.

Figure 6:
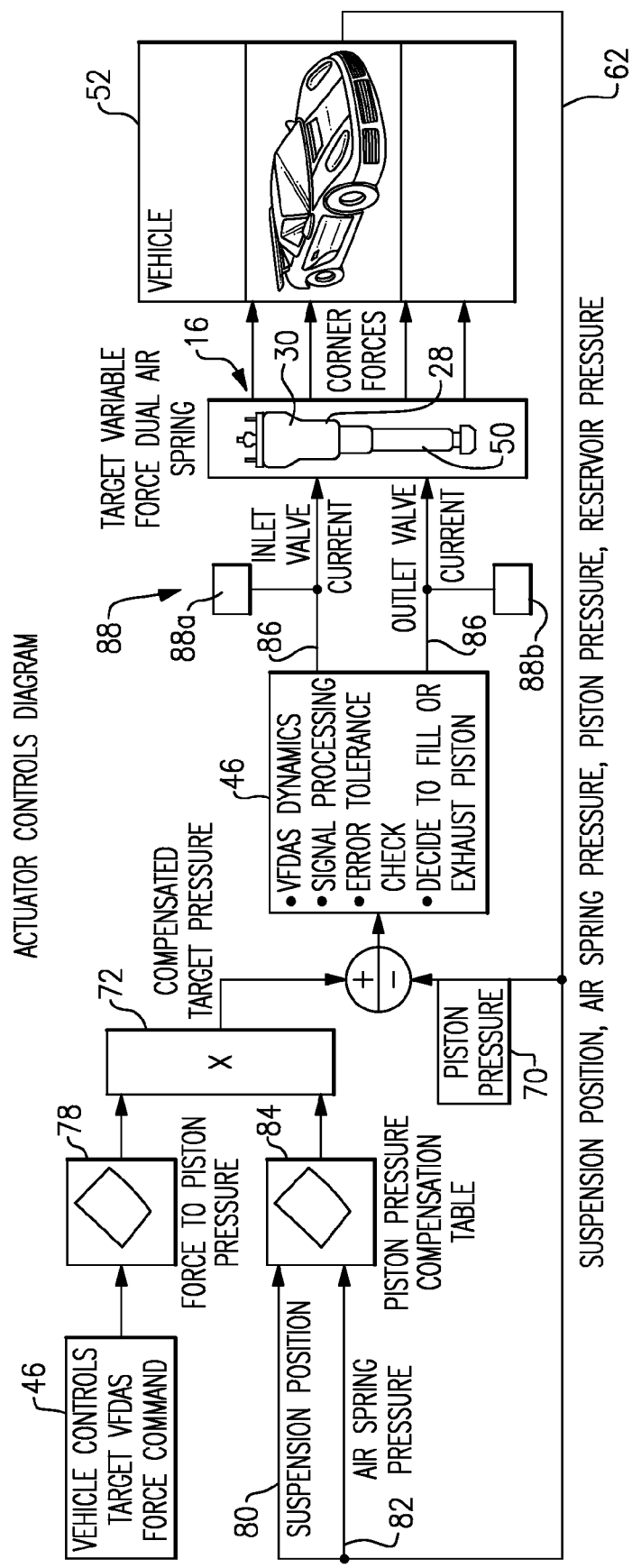
FIG. 6 is a diagram showing a closed-loop actuator control configuration.

FIG. 6 shows one example of an actuator control diagram. Each piston airbag 28 includes an associated pressure sensor 70. This pressure sensor 70 continuously monitors and measures pressure within the piston airbag 28 and communicates this information to the controller 46 as pressure input signals. The controller 46 compiles all of the inputs and determines a compensated target pressure 72 for each air spring assembly 16. The compensated target pressure 72 is comprised of two main aspects.

First, the controller 46 generates an internal corner force command, which then gets mapped to piston pressure 78 based on various driver and vehicle inputs. Second, the controller 46 analyzes other inputs, such as suspension position 80 and air spring pressure 82 for example, and uses a piston pressure compensation table 84 to achieve more accuracy to determine the compensated target pressure. The piston pressure compensation table 84 is based on the physical design (determined by test data) and is used to more accurately control piston pressure 78. The force to piston pressure 78 and the piston pressure compensation table 84 are then considered together to determine the compensated target pressure 72. The controller 46 then, based on this compensated target pressure 72, compensates for various system dynamics and performs tolerance checks and signal processing checks to determine whether or not the piston airbag 28 should be inflated or deflated (exhausted).

If inflation or deflation is required, the controller 46 generates a control signal 86 that is communicated to a valve assembly 88 associated with the air spring assembly 16. In one example, the valve assembly 88 includes at least one valve 88a for filling or inflating the piston airbag 28 and another separate valve 88b for deflating or exhausting the piston airbag 28. The valve assembly 88 can also include additional valves for controlling inflation and deflation of the primary airbag 30. The valves 88a, 88b are open/closed as needed to achieve the desired compensated target pressure.

Once this compensated target pressure is achieved, the pressure sensor 70 then continuously feeds back pressure data from the piston airbag 28 to the controller 46 in a closed loop manner. The controller 46 compares the measured pressures to the target pressures and then determines if further adjustment/compensation is needed. In one example, the controller 46 uses the measured pressures to determine the diameter of the piston airbag 28. If the diameter is not configured to provide the desired spring rate and stiffness, the controller can then inflate/deflate the piston airbag 28 as needed to achieve the desired configuration and spring characteristics. The controller 46 does this for each air spring assembly 16 independently of the others.

It should be understood that the controller 46 could comprise a single vehicle controller that controls all vehicle systems, or the controller 46 could be comprised of several controllers and control modules that are linked together to transfer and communicate various data inputs and outputs as needed. Further, one of ordinary skill in the art would be able to determine a software algorithm to accomplish the steps set forth above.

Closed loop control of the piston airbag pressure allows control of spring force in the variable rate dual air spring. Based on measured and targeted piston pressures, the output of the controller actuates an input or exhaust valve to supply or remove air from the piston airbag as needed. This in turn modulates an inflated diameter of the piston airbag. By additionally taking into account spring displacement and/or air spring pressures (such as pressure within the primary and/or piston airbags) that are measured or estimated, the accuracy of the controller can be increased. When implemented in a conventional automotive application, the coupling of this invention with vehicle level controls and variable force and rate dual air springs, the system provides real-time control of the modulation of spring stiffness to improve vehicle handling and/or ride comfort.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air suspension system comprising:
    at least one air spring assembly including a piston airbag and a primary air bag mounted around said piston airbag;
    at least one pressure sensor that continuously measures pressure within said piston airbag, said pressure sensor generating a pressure signal that corresponds to a measured pressure;
    a valve assembly that controls air supply into and out of said piston airbag; and
    a controller that receives said pressure signal as an input, compares this input to at least one desired piston airbag characteristic, and generates an output signal to modify pressure within said piston airbag if said input is different from said desired piston airbag characteristic, wherein said controller determines spring displacement and compensates for deflection based on spring displacement and piston pressure.

2. The air suspension system according to claim 1 wherein said desired piston airbag characteristic comprises a desired piston airbag diameter to provide a desired spring stiffness.

3. The air suspension system according to claim 2 wherein said controller continuously receives pressure input signals from said pressure sensor indicating pressure changes within said piston airbag, and wherein said controller actively adjusts pressure within said piston airbag in response to the pressure changes to maintain said desired spring stiffness in a closed-loop manner.

4. The air suspension system according to claim 3 wherein said controller generates electric control signals to actively control said valve assembly to control air flow into and out of said piston airbag.

5. The air suspension system according to claim 2 wherein said at least one air spring assembly comprises a plurality of air spring assemblies each having one primary airbag and one associated piston airbag, said valve assembly comprises a separate valve assembly for each air spring assembly, and said at least one pressure sensor comprises a plurality of pressure sensors with one pressure sensor being associated with each piston airbag, and wherein said controller continuously receives pressure input signals from each of said pressure sensors indicating specific pressure changes within said associated piston airbag, and wherein said controller actively adjusts pressure within each of said piston airbags in response to the pressure changes to maintain said desired spring stiffness in a closed-loop manner.

6. The air suspension system according to claim 5 wherein said controller generates a plurality of control signals to control air supply into and out of each piston airbag independently of all other piston airbags.

7. The air suspension system according to claim 5 including at least one damper mounted to each air spring assembly.

8. The air suspension system according to claim 7 wherein said at least one damper comprises an electrically controlled shock absorber.

9. The air suspension system according to claim 5 wherein each of said separate valve assemblies includes an inlet valve and an outlet valve that are separate from each other and are controlled independently of each other.

10. The air suspension system according to claim 5 wherein said controller continuously adjusts spring force and spring rate of each of said air spring assemblies by individually controlling air flow into and out of each piston airbag and each primary airbag.

11. A method of controlling airflow within an air suspension system comprising the steps of:
    (a) providing at least one air spring assembly including a piston airbag and a primary air bag mounted around the piston airbag, and providing a valve assembly that controls air supply into and out of the piston airbag;
    (b) continuously measuring pressure within the piston airbag and generating a pressure signal that corresponds to a measured pressure;
    (c) receiving pressure signals from step (b) as an input, comparing this input to at least one desired piston airbag characteristic, and generating an output control signal to modify pressure within the piston airbag via the valve assembly if the input is different from the desired piston airbag characteristic; and
    (d) receiving a plurality of driver inputs, receiving a plurality of vehicle inputs, and determining a compensated target pressure for each air spring assembly based on the measured pressure, driver inputs, and vehicle inputs wherein the compensated target pressure comprises the at least one desired piston airbag characteristic.

12. The method according to claim 11 wherein the desired piston airbag characteristic comprises a desired piston airbag diameter to provide a desired spring stiffness.

13. The method according to claim 11 including continuously receiving pressure input signals from a pressure sensor indicating pressure changes within the piston airbag, and actively adjusting pressure within the piston airbag in response to the pressure changes to maintain the desired spring stiffness in a closed-loop manner.

14. The method according to claim 11 wherein the at least one air spring assembly comprises a plurality of air spring assemblies each having one primary airbag and one associated piston airbag, the valve assembly comprises a separate valve assembly for each air spring assembly, and including providing a plurality of pressure sensors with one pressure sensor being associated with each piston airbag, and including the steps of continuously receiving pressure input signals from each of the pressure sensors indicating specific pressure changes within the associated piston airbag, and actively adjusting pressure within each of the piston airbags in response to the pressure changes to maintain the desired spring stiffness for each air spring assembly in a closed-loop manner.

15. The method according to claim 11 including providing the air spring assembly with a lower mount to be attached to a longitudinally extending arm member, a piston support attached to the lower mount, and an upper mount to be attached to a vehicle structure, and including mounting a lower end of the piston airbag to a first portion of the piston support, mounting an upper end of the piston airbag to a second portion of the piston support, mounting a lower end of the primary airbag to the upper end of the piston airbag, mounting an upper end of the primary airbag to the upper mount, and mounting an outer structure of a damper to the lower mount.

16. The air suspension system according to claim 1 wherein said air spring assembly includes a lower mount to be attached to a longitudinally extending arm member, a piston support attached to said lower mount, and an upper mount to be attached to a vehicle structure, and wherein a lower end of said piston airbag is mounted to a first portion of said piston support, an upper end of said piston airbag is mounted to a second portion of said piston support, a lower end of said primary airbag is mounted to said upper end of said piston airbag, and an upper end of said primary airbag is mounted to said upper mount.

17. The air suspension system according to claim 16 including a damper having an outer structure that is mounted to said lower mount.

18. The air suspension system according to claim 1 wherein said controller receives a plurality of driver inputs and a plurality of vehicle inputs, and wherein said controller determines a compensated target pressure for said air spring assembly based on said inputs, with the compensated target pressure comprising the at least one desired piston airbag characteristic.

19. An air suspension system comprising:
at least one air spring assembly including a piston airbag and a primary air bag mounted around said piston airbag, wherein said at least one air spring assembly comprises a plurality of air spring assemblies each having one primary airbag and one associated piston airbag;
at least one damper mounted to each air spring assembly, wherein said at least one damper comprises an electrically controlled shock absorber;
at least one pressure sensor that continuously measures pressure within said piston airbag, said pressure sensor generating a pressure signal that corresponds to a measured pressure, wherein said at least one pressure sensor comprises a plurality of pressure sensors with one pressure sensor being associated with each piston airbag;
a valve assembly that controls air supply into and out of said piston airbag, wherein said valve assembly comprises a separate valve assembly for each air spring assembly; and
a controller that receives said pressure signal as an input, compares this input to at least one desired piston airbag characteristic, and generates an output signal to modify pressure within said piston airbag if said input is different from said desired piston airbag characteristic, wherein said desired piston airbag characteristic comprises a desired piston airbag diameter to provide a desired spring stiffness, wherein said controller continuously receives pressure input signals from each of said pressure sensors indicating specific pressure changes within said associated piston airbag, and wherein said controller actively adjusts pressure within each of said piston airbags in response to the pressure changes to maintain said desired spring stiffness in a closed-loop manner.

20. An air suspension system comprising:
at least one air spring assembly including a piston airbag and a primary air bag mounted around said piston airbag;
at least one pressure sensor that continuously measures pressure within said piston airbag, said pressure sensor generating a pressure signal that corresponds to a measured pressure;
a valve assembly that controls air supply into and out of said piston airbag; and
a controller that receives said pressure signal as an input, compares this input to at least one desired piston airbag characteristic, and generates an output signal to modify pressure within said piston airbag if said input is different from said desired piston airbag characteristic, wherein said controller receives a plurality of driver inputs and a plurality of vehicle inputs, and wherein said controller determines a compensated target pressure for said air spring assembly based on said inputs, with the compensated target pressure comprising the at least one desired piston airbag characteristic.

21. A method of controlling airflow within an air suspension system comprising the steps of:
(a) providing at least one air spring assembly including a piston airbag and a primary air bag mounted around the piston airbag, and providing a valve assembly that controls air supply into and out of the piston airbag;
(b) continuously measuring pressure within the piston airbag and generating a pressure signal that corresponds to a measured pressure;
(c) receiving pressure signals from step (b) as an input, comparing this input to at least one desired piston airbag characteristic, generating an output control signal to modify pressure within the piston airbag via the valve assembly if the input is different from the desired piston airbag characteristic; and
(d) determining spring displacement;
wherein step (c) further includes compensating for deflection based on spring displacement and piston pressure.

* * * * *